(12) United States Patent
Matsushiro et al.

(10) Patent No.: US 11,506,089 B2
(45) Date of Patent: Nov. 22, 2022

(54) COMBINED CYCLE PLANT, CONTROL DEVICE THEREOF, AND STEAM TURBINE STARTUP METHOD

(71) Applicant: Mitsubishi Hitachi Power Systems, Ltd., Kanagawa (JP)

(72) Inventors: Goichi Matsushiro, Kanagawa (JP); Ken Hatano, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/731,363

(22) Filed: Dec. 31, 2019

(65) Prior Publication Data

US 2020/0132032 A1    Apr. 30, 2020

Related U.S. Application Data

(62) Division of application No. 15/637,246, filed on Jun. 29, 2017, now abandoned.

(30) Foreign Application Priority Data

Jul. 12, 2016   (JP) ................... 2016-138030

(51) Int. Cl.
  *F02C 6/18*   (2006.01)
  *F01D 19/00*  (2006.01)
  (Continued)

(52) U.S. Cl.
  CPC .......... *F01K 23/103* (2013.01); *F01D 19/00* (2013.01); *F01K 17/025* (2013.01); *F01K 23/10* (2013.01);
  (Continued)

(58) Field of Classification Search
  CPC ...... F01K 23/103; F01K 23/105; F01K 23/10; F01K 13/02; F01K 17/025; Y02E 20/16; F02C 6/18; F05D 2220/72
  See application file for complete search history.

(56) References Cited

U.S. PATENT DOCUMENTS 3,965,675 A    6/1976  Martz
4,028,884 A *  6/1977  Martz .................. F01K 23/108
                                              60/39.182
(Continued)

FOREIGN PATENT DOCUMENTS

CA    2 242 073    1/1999
JP    61-101607    5/1986
(Continued)

OTHER PUBLICATIONS

Notice of Reasons for Refusal dated Mar. 3, 2020 in corresponding Japanese Patent Application No. 2016/138030, with English Translation.

*Primary Examiner* — Todd E Manahan
*Assistant Examiner* — Alyson Joan Harrington
(74) *Attorney, Agent, or Firm* — Wenderoth, Lind & Ponack, L.L.P.

(57) ABSTRACT

A combined cycle plant includes: a gas turbine having a compressor, a combustor, and a turbine; a supplementary firing burner configured to raise a temperature of an exhaust gas of the gas turbine; a heat recovery steam generator configured to generate a steam using an exhaust heat of the exhaust gas; a steam turbine configured to be driven by the steam generated by the heat recovery steam generator; and a control device configured to change both an output of the combustor and an output of the supplementary firing burner when an output of the combined cycle plant is to be changed.

1 Claim, 5 Drawing Sheets

(51) Int. Cl.
  *F01K 23/10* (2006.01)
  *F02C 9/56* (2006.01)
  *F01K 17/02* (2006.01)

(52) U.S. Cl.
  CPC ................ *F02C 6/18* (2013.01); *F02C 9/56* (2013.01); *F01K 23/101* (2013.01); *Y02E 20/16* (2013.01)

(56) References Cited

U.S. PATENT DOCUMENTS

| | | | |
|---|---|---|---|
| 4,589,255 A * | 5/1986 | Martens | ................ F01D 17/085 60/646 |
| 10,100,681 B2 | 10/2018 | Farquharson | |
| 2001/0042369 A1 * | 11/2001 | Wakazono | ............ F01K 23/103 60/39.182 |
| 2010/0275610 A1 | 11/2010 | Oguchi et al. | |
| 2016/0319702 A1 * | 11/2016 | Martindale | ............. F01K 13/02 |

FOREIGN PATENT DOCUMENTS

| | | |
|---|---|---|
| JP | 11-22419 | 1/1999 |
| JP | 2009-79580 | 4/2009 |
| WO | 2016/064411 | 4/2016 |

\* cited by examiner

COMBINED CYCLE PLANT, CONTROL DEVICE THEREOF, AND STEAM TURBINE STARTUP METHOD

TECHNICAL FIELD

The present invention relates to a combined cycle plant including a gas turbine, a heat recovery steam generator, and a steam turbine, a control device of this combined cycle plant, and a steam turbine startup method.

BACKGROUND ART

Combined cycle power generation involves first driving a gas turbine with natural gas etc. as fuel to generate electricity the first time, and then recovering exhaust gas of the gas turbine and generating steam by a heat recovery steam generator and driving a steam turbine with this steam to generate electricity the second time. A combined cycle plant is a power generation plant to perform this combined cycle power generation.

Some combined cycle plants have a supplementary firing burner provided in the heat recovery steam generator. Specifically, the supplementary firing burner is disposed at an exhaust gas inlet of the heat recovery steam generator, and fuel is supplied to this supplementary firing burner and ignited to form a flame, which raises the temperature of exhaust gas and thereby promotes steam generation in the heat recovery steam generator.

Examples of combined cycle plants having a heat recovery steam generator provided with such a supplementary firing burner include the one described in Japanese Patent Publication No. 11-022419.

SUMMARY OF INVENTION

Technical Problem

To start up the above-described combined cycle plant, first, the gas turbine is started up, next, exhaust gas generated is sent to the heat recovery steam generator to generate steam, and then the steam turbine is driven with this steam. After the steam turbine is warmed up with the steam from the heat recovery steam generator, the output of the steam turbine is increased to a predetermined output. Then, the supplementary firing burner is ignited to raise the temperature of the exhaust gas and thereby increase the output to a maximum output (combined maximum output). Thus, the output of the steam turbine is increased to the maximum output that is achievable with the exhaust gas of the gas turbine, and then the output is increased to the maximum output of the steam turbine using the exhaust gas that has been raised in temperature by the supplementary firing burner. Accordingly, the conventional steam turbine takes a long startup time until the maximum output is reached.

The present invention is devised to solve the above problem, and an object thereof is to provide a combined cycle plant, a control device of the combined cycle plant, and a steam turbine startup method that are aimed at improving the operability of a combined cycle plant by allowing a quick change of the output.

Solution to Problem

A combined cycle plant of the present invention to achieve the above object includes: a gas turbine having a compressor, a combustor, and a turbine; a supplementary firing burner that raises the temperature of exhaust gas of the gas turbine; a heat recovery steam generator that generates steam using exhaust heat of the exhaust gas; a steam turbine that is driven by steam generated by the heat recovery steam generator; and a control device that changes both an output of the combustor and an output of the supplementary firing burner when an output of the combined cycle plant is to be changed.

Thus, this control device changes both the output of the combustor and the output of the supplementary firing burner when the output of the combined cycle plant is to be changed, so that the output of the combined cycle plant can be quickly increased or reduced. Accordingly, it is possible to improve the operability of the combined cycle plant by allowing a quick change of the output.

In the combined cycle plant of the present invention, the control device has a first output change mode in which the output of the combustor is changed and the output of the supplementary firing burner is held constant when the output of the combined cycle plant is to be changed, and a second output change mode in which both the output of the combustor and the output of the supplementary firing burner are changed when the output of the combined cycle plant is to be changed; and the control device is capable of selectively switching between the first output change mode and the second output change mode according to a switching signal.

Thus, it is possible to easily change between startup and shutdown of the supplementary firing burner according to the operation state of the steam turbine by selectively switching, according to a switching signal, between the first output change mode in which only the output of the combustor is changed when the output of the combined cycle plant is to be changed, and the second output change mode in which the outputs of the combustor and the supplementary firing burner are changed when the output of the combined cycle plant is to be changed.

In the combined cycle plant of the present invention, the control device selects the first output change mode at startup of the steam turbine, and switches to the second output change mode after completion of warming up of the steam turbine.

Thus, at startup of the steam turbine, only the output of the combustor is increased to warm up the steam turbine, and after completion of warming up of the steam turbine, the outputs of both the combustor and the supplementary firing burner are increased. Accordingly, it is possible to reduce the startup time by quickly increasing the output of the steam turbine to a predetermined output.

In the combined cycle plant of the present invention, the control device selects the first output change mode at startup of the steam turbine, and switches to the second output change mode before an output of the steam turbine reaches a maximum output that is achievable with steam generated using only the exhaust heat of the exhaust gas of the gas turbine.

Thus, at startup of the steam turbine, only the output of the combustor is increased to warm up the steam turbine, and before the output of the steam turbine reaches the maximum output that is achievable with steam generated using only the exhaust heat of the exhaust gas of the gas turbine, the outputs of both the combustor and the supplementary firing burner are increased. Accordingly, it is possible to reduce the startup time by quickly increasing the output of the steam turbine to a predetermined output.

In the combined cycle plant of the present invention, the control device has a third output change mode in which the output of the combustor is changed when the output of the combined cycle plant is to be changed, and after a preset predetermined output is reached, the output of the supplementary firing burner is changed; and the control device is capable of selectively switching between the second output change mode and the third output change mode according to a switching signal.

Thus, the flexibility is improved as the control device can select whether to change the outputs of the combustor and the supplementary firing burner at the same time, or to change the output of the combustor and then change the output of the supplementary firing burner, when the output of the combined cycle plant is to be changed.

In the combined cycle plant of the present invention, the control device has: a first operation mode in which both the output of the combustor and the output of the supplementary firing burner are changed when the output of the combined cycle plant is to be changed at startup of the steam turbine, and after a target output is reached, the output of the combustor is preferentially changed in response to a variation in the target output; and a second operation mode in which the output of the combustor is held constant and the output of the supplementary firing burner is changed in response to a variation in the target output.

Thus, in the first operation mode, the output of the combustor is preferentially changed in response to a variation in the target output, so that it is possible to rapidly increase and reduce the output of the combined cycle plant by changing the output of the combustor, which is highly responsive, according to a variation in the target output. In the second operation mode, the output of the combustor is held constant and the output of the supplementary firing burner is changed in response to a variation in the target output, so that it is possible to improve the plant efficiency by holding the output of the combustor constant relative to the target output and preferentially using this output while keeping down the output of the low-efficiency supplementary firing burner.

A control device of a combined cycle plant of the present invention is a control device of a combined cycle plant including: a gas turbine having a compressor, a combustor, and a turbine; a supplementary firing burner that raises the temperature of exhaust gas of the gas turbine; a heat recovery steam generator that generates steam using exhaust heat of the exhaust gas; and a steam turbine that is driven by steam generated by the heat recovery steam generator. The control device is configured to change both an output of the combustor and an output of the supplementary firing burner when an output of the combined cycle plant is to be changed.

Thus, both the output of the combustor and the output of the supplementary firing burner are changed when the output of the combined cycle plant is to be changed, so that the output of the combined cycle plant can be quickly increased or reduced. Accordingly, it is possible to improve the operability of the combined cycle plant by allowing a quick change of the output.

A steam turbine startup method of the present invention is a method of starting up a steam turbine in a combined cycle plant including: a gas turbine having a compressor, a combustor, and a turbine; a supplementary firing burner that raises the temperature of exhaust gas of the gas turbine; a heat recovery steam generator that generates steam using exhaust heat of the exhaust gas; and a steam turbine that is driven by steam generated by the heat recovery steam generator. The method includes the steps of: increasing an output of the combustor at startup of the steam turbine; and increasing both the output of the combustor and an output of the supplementary firing burner after completion of warming up of the steam turbine.

Thus, the output of the combustor is increased at startup of the steam turbine, and the outputs of the combustor and the supplementary firing burner are increased after completion of warming up of the steam turbine. Accordingly, it is possible to reduce the startup time of the combined cycle plant and improve the operability by quickly increasing the output of the steam turbine to a predetermined output after completion of warming up of the steam turbine.

Advantageous Effects of Invention

According to the combined cycle plant, the control device thereof, and the steam turbine startup method of the present invention, the outputs of the combustor and the supplementary firing burner are changed when the output of the combined cycle plant is to be changed. Thus, it is possible to improve the operability of the combined cycle plant by allowing a quick change of the output.

DESCRIPTION OF EMBODIMENT

A preferred embodiment of a combined cycle plant, a control device thereof, and a steam turbine startup method according to the present invention will be described below in detail with reference to the accompanying drawings. However, the present invention is not limited by this embodiment, and if there are a plurality of embodiments, the invention also includes an embodiment combining these embodiments.

Figure 1:
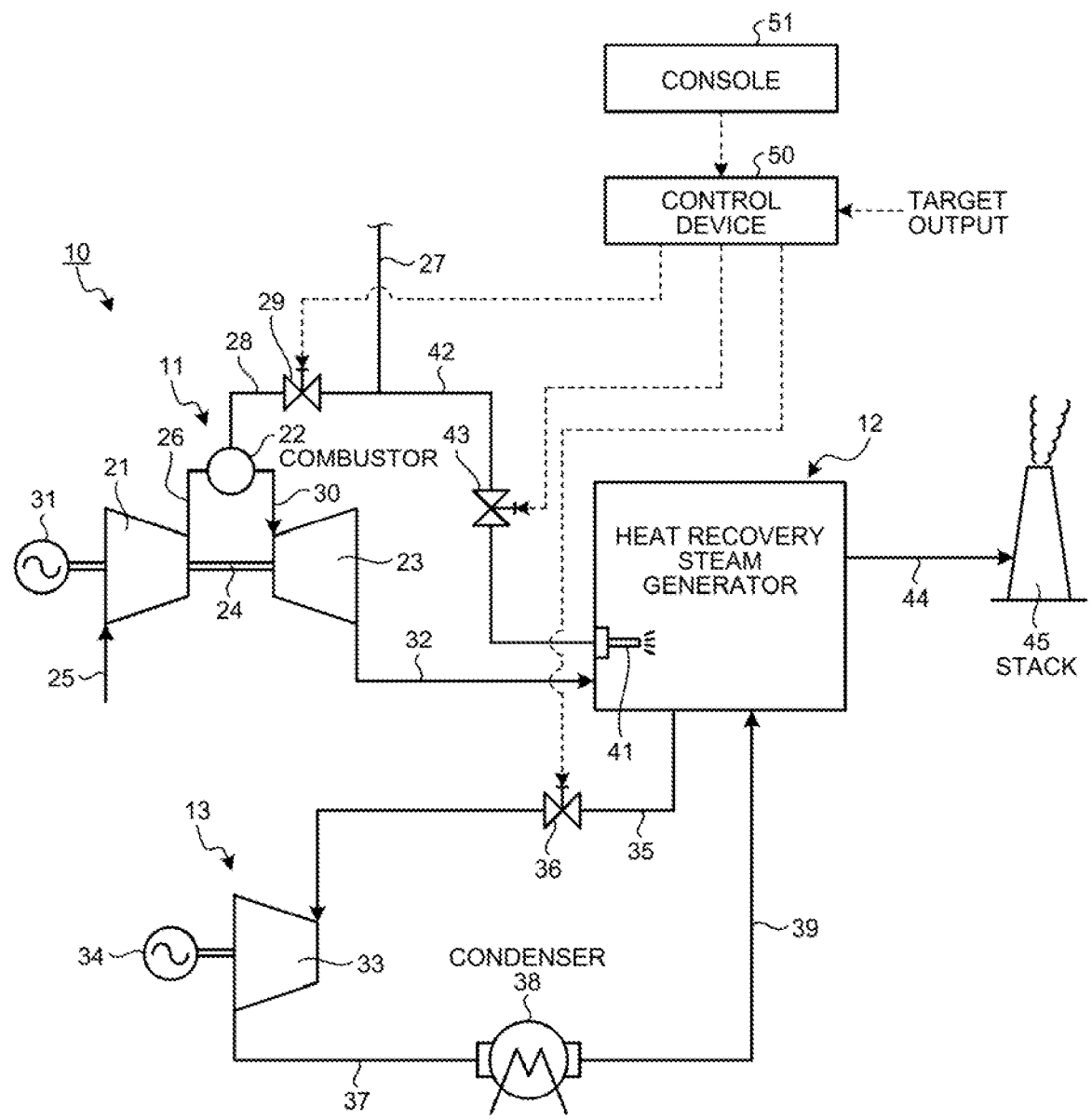
FIG. 1 is a schematic configuration diagram showing a combined cycle plant of an embodiment.

FIG. 1 is a schematic configuration diagram showing the combined cycle plant of the embodiment.

In this embodiment, as shown in FIG. 1, a combined cycle plant 10 includes a gas turbine 11, a heat recovery steam generator (HRSG) 12, and a steam turbine 13.

The gas turbine 11 has a compressor 21, a combustor 22, and a turbine 23, and the compressor 21 and the turbine 23 are coupled together by a rotating shaft (rotor) 24 so as to be integrally rotatable. The compressor 21 compresses air taken in through an air intake line 25. The combustor 22 mixes compressed air supplied from the compressor 21 through a compressed air supply line 26 and fuel gas supplied through a first fuel gas supply line 28 branched from a fuel gas supply line 27, and combusts the mixture. The first fuel gas supply line 28 is provided with a flow regulating valve 29 that adjusts the amount of fuel gas supplied to the combustor 22. The turbine 23 is driven to rotate by combustion gas supplied from the combustor 22 through a combustion gas supply line 30. A generator 31 is provided coaxially with the compressor 21 and the turbine 23, and can generate electricity as the turbine 23 rotates.

The heat recovery steam generator 12 generates steam using exhaust heat of exhaust gas discharged from the gas turbine 11 (turbine 23) through an exhaust gas discharge line 32. The heat recovery steam generator 12 has a superheater, an evaporator, and an economizer as heat exchangers (none is shown). As the exhaust gas of the gas turbine 11 passes through the inside, the heat recovery steam generator 12 recovers heat by the superheater, the evaporator, and the economizer in this order and generates steam.

The steam turbine 13 is driven by superheated steam generated by the heat recovery steam generator 12. The steam turbine 13 has a turbine 33, and a generator 34 is coupled coaxially to the turbine 33. The superheated steam generated by the heat recovery steam generator 12 (superheater) is supplied to the turbine 33 through a steam supply line 35, and the generator 34 can generate electricity as the turbine 33 rotates. A flow regulating valve 36 is provided in the steam supply line 35.

Steam discharged from the turbine 33 is supplied to a condenser 38 through a steam discharge line 37. The condenser 38 cools the recovered steam with cooling water to condense the steam. The condenser 38 sends the generated condensate to the heat recovery steam generator 12 (economizer) through a condensate supply line 39.

The heat recovery steam generator 12 is further provided with a supplementary firing burner 41 that heats and raises the temperature of the exhaust gas discharged from the gas turbine 11 (turbine 23) through an exhaust gas discharge line 32. The supplementary firing burner 41 combusts fuel gas supplied through a second fuel gas supply line 42 branched from the fuel gas supply line 27. The second fuel gas supply line 42 is provided with a flow regulating valve 43 that adjusts the amount of fuel gas supplied to the supplementary firing burner 41. A stack 45 is coupled to the heat recovery steam generator 12 through an exhaust gas discharge line 44 through which the exhaust gas having been used for generating steam is discharged.

When the combined cycle plant 10 is operated, in the gas turbine 11, the compressor 21 compresses air, and the combustor 22 mixes the compressed air and fuel gas supplied thereto and combusts the mixture. The turbine 23 is driven to rotate by the combustion gas supplied from the combustor 22, and the generator 31 generates electricity. The exhaust gas discharged from the gas turbine 11 (turbine 23) is sent to the heat recovery steam generator 12 to generate steam, and superheated steam is sent to the steam turbine 13. Meanwhile, the supplementary firing burner 41 is activated as necessary to combust the fuel gas and thereby heat and raise the temperature of the exhaust gas discharged from the turbine 23. The turbine 33 is driven to rotate by this superheated steam, so that the generator 34 generates electricity. The steam having been used in the turbine 33 is cooled and condensed by the condenser 38 before being returned to the heat recovery steam generator 12.

The control device 50 can adjust the degrees of opening of the flow regulating valves 29, 36, 43. By adjusting the degree of opening of the flow regulating valve 29, the control device 50 adjusts the amount of fuel gas supplied to the combustor 22 through the first fuel gas supply line 28. By adjusting the degree of opening of the flow regulating valve 43, the control device 50 adjusts the amount of fuel gas supplied to the supplementary firing burner 41 through the second fuel gas supply line 42. By adjusting the degree of opening of the flow regulating valve 36, the control device 50 adjusts the amount of superheated steam supplied from the heat recovery steam generator 12 to the turbine 33 through the steam supply line 35.

The control device 50 can control the gas turbine 11, the heat recovery steam generator 12, the steam turbine 13, the supplementary firing burner 41, etc. of the combined cycle plant 10. A console 51 is connected to the control device 50, and the control device 50 controls the gas turbine 11, the heat recovery steam generator 12, the steam turbine 13, the supplementary firing burner 41, etc. according to various commands that are input from the console 51.

In this embodiment, at startup of the combined cycle plant 10, the gas turbine 11 is started up and then the exhaust gas is supplied to the heat recovery steam generator 12. This exhaust gas is heated and raised in temperature by the supplementary firing burner 41, and superheated steam is supplied to the steam turbine 13 to start up the steam turbine 13. Meanwhile, at startup of the steam turbine 13, the control device 50 increases the output of the combustor 22 while keeping the supplementary firing burner 41 shut down, and after completion of warming up of the steam turbine 13, the control device 50 increases the outputs of the combustor 22 and the supplementary firing burner 41 so that the steam turbine 13 reaches a predetermined output.

When the gas turbine 11 starts up and the heat recovery steam generator 12 generates steam from the exhaust gas of the gas turbine 11 and supplies this steam to the steam turbine 13 to drive the steam turbine 13 to rotate, if there is a large temperature difference between the steam temperature and a metal temperature of the steam turbine 13, a difference in thermal expansion occurs among constituent members of the steam turbine 13 and thermal stress acts on these members. For example, a difference in thermal expansion occurring between a blade and a casing leads to a pinch point (minimum clearance), at which the clearance between a tip of the blade and an inner wall surface of the casing becomes temporarily narrow. Therefore, after the temperature difference between the steam temperature and the metal temperature of the steam turbine 13 has decreased, the amount of superheated steam supplied to the steam turbine 13 is increased so that the output of the steam turbine 13 reaches a predetermined output.

At startup of the steam turbine 13, until warming up of the steam turbine 13 is completed, i.e., until the temperature difference between the steam temperature and the metal temperature of the steam turbine 13 decreases to or below a preset predetermined value, the supplementary firing burner 41 is kept shut down and only the combustor 22 is driven, and the steam turbine 13 is warmed up with the exhaust gas discharged from the turbine 23. Thereafter, when warming up of the steam turbine 13 is completed, i.e., when the temperature difference between the steam temperature and the metal temperature of the steam turbine 13 has decreased to or below the preset predetermined value, the supplementary firing burner 41 is started up in addition to the combustor 22, and the temperature of the exhaust gas discharged from the turbine 23 is raised by the supplementary firing burner 41 to increase the output of the steam turbine 13 using the exhaust gas that has been discharged from the turbine 23 and raised in temperature by the supplementary firing burner 41.

Figure 2:
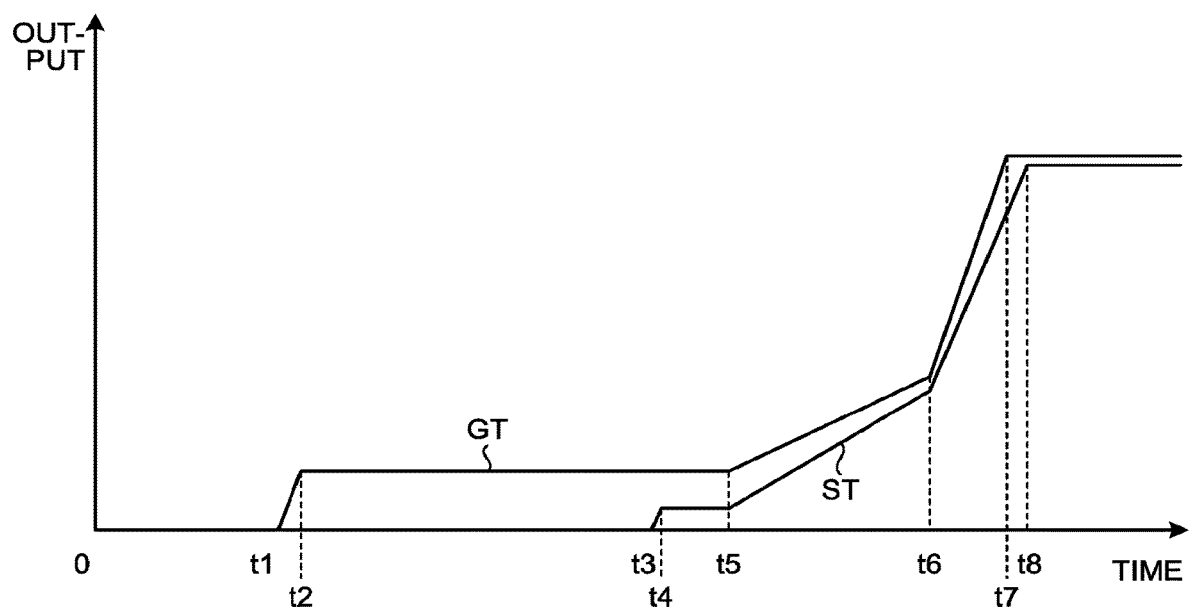
FIG. 2 is a graph showing an output of the combined cycle plant at startup.

First, a method of starting up the combined cycle plant 10 will be described in detail. FIG. 2 is a graph showing an output of the combined cycle plant at startup.

As shown in FIG. 1 and FIG. 2, after the gas turbine 11 starts up, at time t1, the output of the gas turbine 11 increases, and at time t2, the output of the gas turbine 11 becomes constant as the steam temperature increases to a temperature at which steam is to be passed through the steam turbine 13. At this point, the exhaust gas of the gas turbine 11 is sent to the heat recovery steam generator 12 and steam is generated. After the steam temperature is raised to a temperature at which the steam can be passed through the steam turbine 13, the flow regulating valve 36 is slightly opened, so that a small amount of steam is sent to the steam turbine 13 to start rotating the steam turbine 13. At time t3, the output of the steam turbine 13 increases, and at time t4, the output becomes constant and warming up of the steam turbine 13 is started. Then, at time t5, the degree of opening of the flow regulating valve 29 is increased to increase the output of the gas turbine 11, while the degree of opening of the flow regulating valve 36 is increased to increase the output of the steam turbine 13.

Then, at time t6, when the metal temperature of the steam turbine 13 reaches a predetermined temperature and warming up is completed, the degree of opening of the flow regulating valve 29 is further increased to increase the output of the gas turbine 11. At time t6, while the degree of opening of the flow regulating valve 36 has reached a degree of full opening, the output of the steam turbine 13 is increased by increasing the flow rate of the steam through an increase in output of the gas turbine 11. Thus, at time t7, the output of the gas turbine 11 increases to a maximum output, and at time t8, the output of the steam turbine 13 increases to a maximum output. In this case, the output of the combined cycle plant 10 is the total of the output of the gas turbine 11 and the output of the steam turbine 13.

Figure 3:
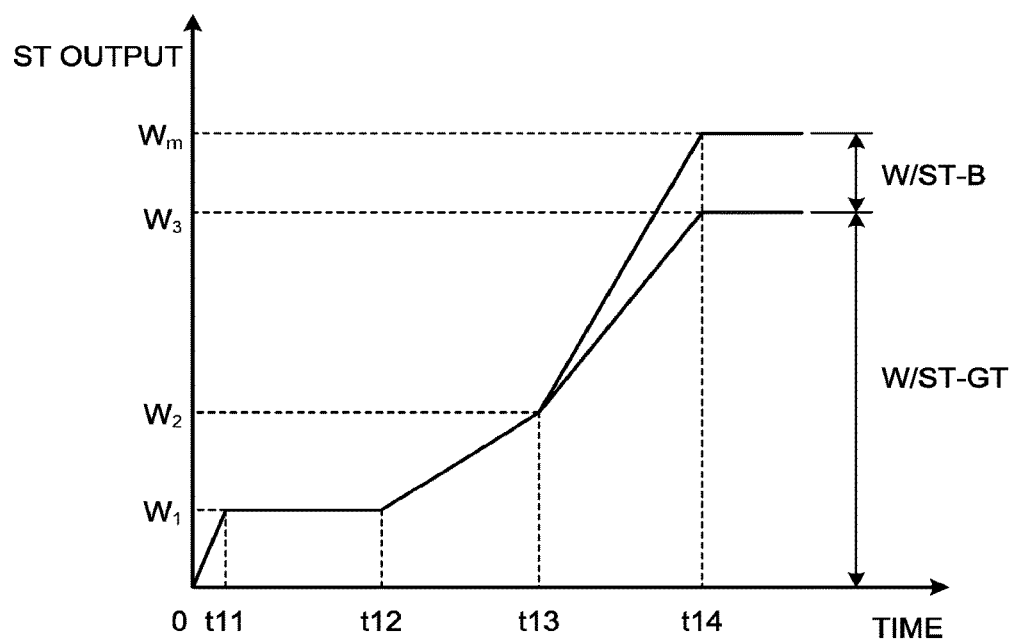
FIG. 3 is a graph showing an ST output of a steam turbine at startup.

Next, a method of starting up the steam turbine 13 will be described. FIG. 3 is a graph showing an ST output of the steam turbine at startup.

As shown in FIG. 3, the steam turbine startup method of this embodiment includes the steps of increasing the output of the combustor 22 at startup of the steam turbine 13, and increasing both the output of the combustor 22 and the output of the supplementary firing burner 41 after completion of warming up of the steam turbine 13. Specifically, the control device 50 selects a first startup mode (first output change mode) in which only the output of the gas turbine 11 (combustor 22) is increased at startup of the steam turbine, and after completion of warming up of the steam turbine 13, switches to a second startup mode (second output change mode) in which the outputs of the gas turbine 11 (combustor 22) and the supplementary firing burner 41 are increased. In this case, completion of warming up of the steam turbine 13 is determined on the basis of the output of the steam turbine 13, a casing temperature, a startup duration time, etc.

To be more specific, as shown in FIG. 1 and FIG. 3, when the gas turbine 11 starts up, the exhaust gas is sent to the heat recovery steam generator 12 and steam is generated. Here, when the flow regulating valve 36 is slightly opened, a small amount of steam is sent from the heat recovery steam generator 12 to the steam turbine 13, so that the steam turbine 13 starts to rotate and the output increases. At time t11, the output of the steam turbine 13 is held constant at an output $W_1$ and warming up of the steam turbine 13 is started.

After a predetermined time has elapsed, at time t12, when the degree of opening of the flow regulating valve 36 increases, the amount of steam supplied from the heat recovery steam generator 12 to the steam turbine 13 increases, so that the output of the steam turbine 13 increases gradually and warming up continues. At time t13, the metal temperature of the steam turbine 13 reaches a predetermined temperature and warming up is completed at an output $W_2$ of the steam turbine 13. Then, the degree of opening of the flow regulating valve 29 is further increased to increase the output of the gas turbine 11. At this point, the supplementary firing burner 41 is started up to heat the steam supplied to the heat recovery steam generator 12 and thereby increase the flow rate of the steam. Thus, as the amount of steam supplied increases and the steam temperature rises, the output of the steam turbine 13 increases, and at time t14, the output of the steam turbine 13 reaches a maximum output $W_m$.

During the period from time t13 to time t14, the degree of opening of the flow regulating valve 29 is gradually increased to increase the amount of fuel gas supplied to the combustor 22, so that the output of the gas turbine 11 increases and the amount of exhaust gas supplied to the heat recovery steam generator 12 increases. Meanwhile, the degree of opening of the flow regulating valve 43 is gradually increased to increase the amount of fuel gas supplied to the supplementary firing burner 41, so that the amount of exhaust gas heated increases and the flow rate of the steam generated by the heat recovery steam generator 12 increases. Thus, the maximum output $W_m$ of the steam turbine 13 reached at time t14 is the total of an output W/ST-GT by the exhaust gas of the gas turbine 11 and an output W/ST-B by a rise in temperature of the exhaust gas of which the temperature is raised by the supplementary firing burner 41. Accordingly, the output of the steam turbine 13 can be increased to an output $W_3$ using the exhaust heat of the exhaust gas of the gas turbine 11, and can be increased to the output $W_m$ using the exhaust heat resulting from the rise in temperature of the exhaust gas of which the temperature is raised by the supplementary firing burner 41.

In this way, the control device 50 operates the combined cycle plant 10 in the first startup mode during the period from time 0 to time t13, and operates the combined cycle plant 10 in the second startup mode during the period from time t13 to time t14. In other words, the control device 50 switches from the first startup mode to the second startup mode by a switching signal when the metal temperature of the steam turbine 13 reaches a predetermined temperature and warming up is completed.

Upon completion of startup of the combined cycle plant 10 (steam turbine 13), the control device 50 has a first operation mode (first output change mode) in which the output of the gas turbine 11 (combustor 22) is preferentially changed in response to a variation in a target output, and a second operation mode (second output change mode) in which the output of the gas turbine 11 (combustor 22) is held constant and the output of the supplementary firing burner 41 is changed in response to a variation in the target output, and the control device 50 can selectively switch between these operation modes according to a switching signal.

Figure 4:
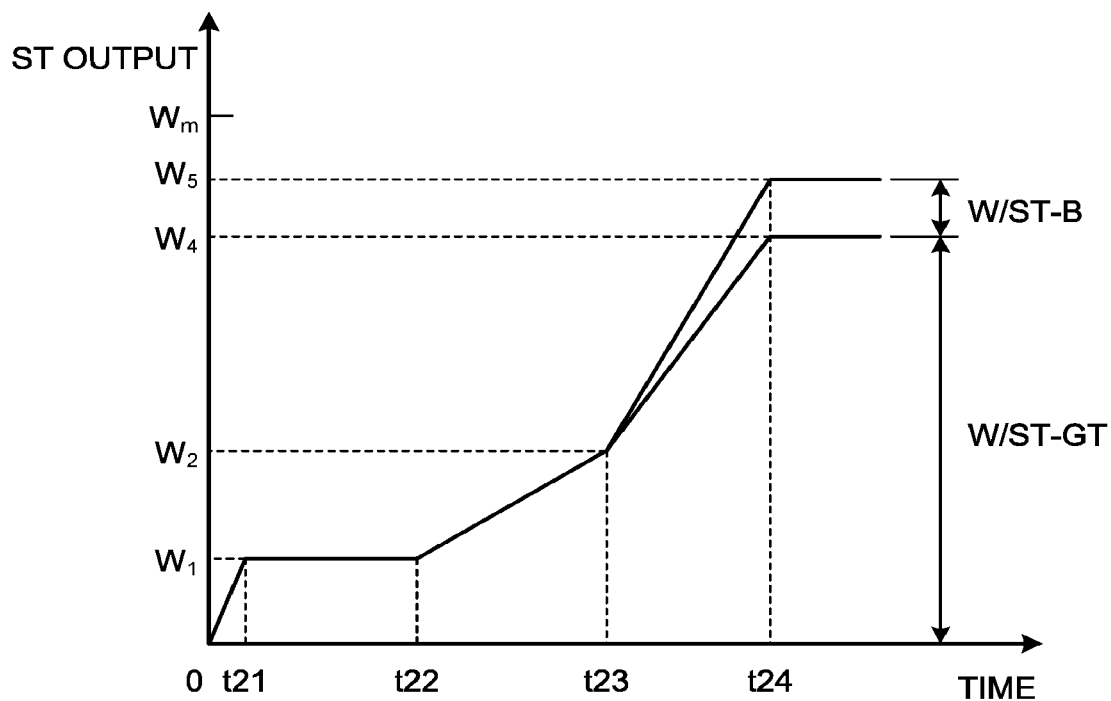
FIG. 4 is a graph showing the ST output of the steam turbine during partial load operation in a first operation mode.
Figure 5:
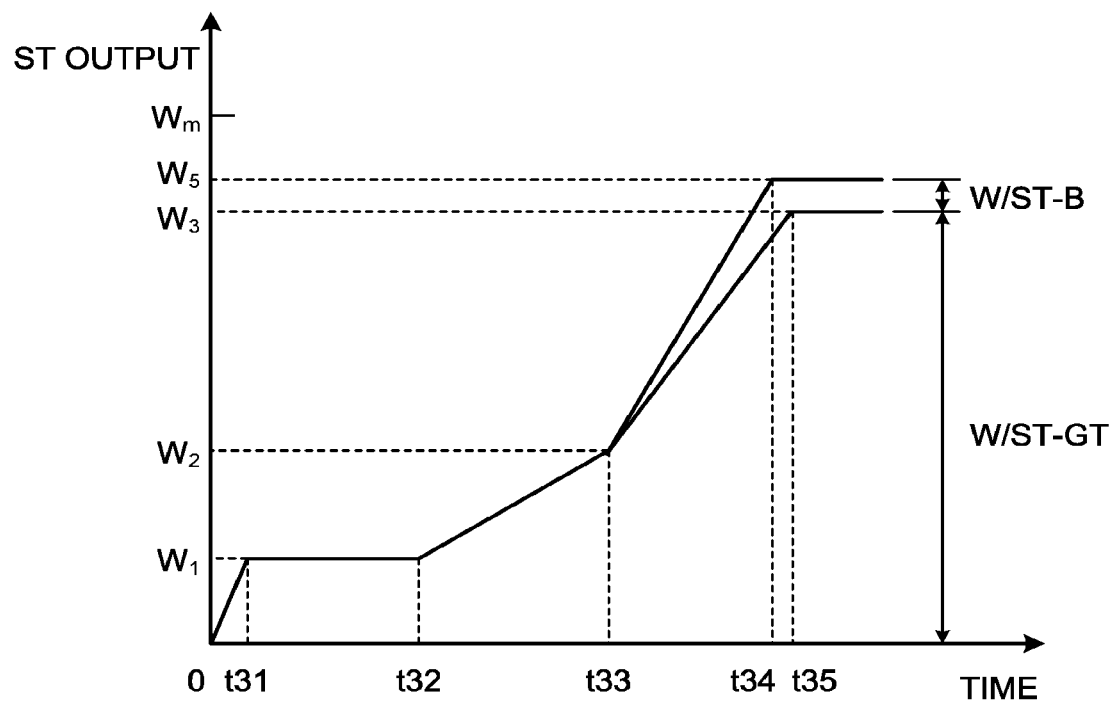
FIG. 5 is a graph showing the ST output of the steam turbine during partial load operation in a second operation mode.
Figure 6:
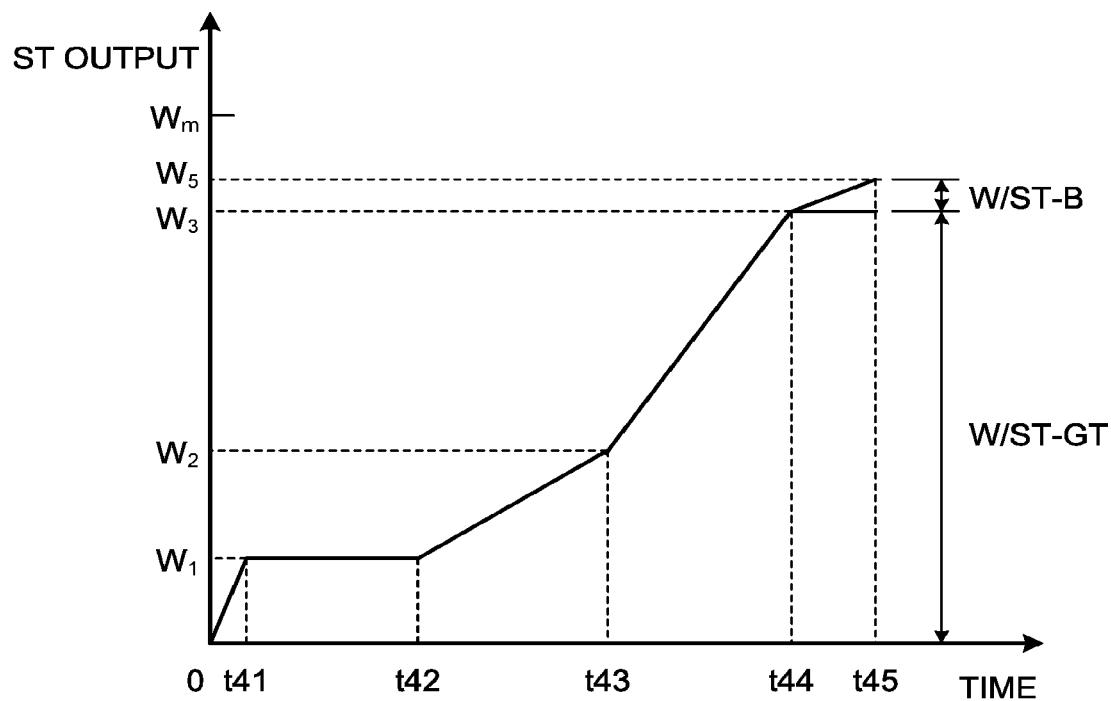
FIG. 6 is a graph showing the ST output of the steam turbine during partial load operation in a third operation mode.

FIG. 4 is a graph showing the ST output of the steam turbine during partial load operation in the first operation mode; FIG. 5 is a graph showing the ST output of the steam turbine during partial load operation in the second operation mode; and FIG. 6 is a graph showing the ST output of the steam turbine during partial load operation in the third operation mode.

As shown in FIG. 1 and FIG. 4, when the control device 50 selects the first startup mode and a small amount of steam is sent from the heat recovery steam generator 12 to the steam turbine 13, the steam turbine 13 starts rotating and the output increases. At time t21, the output of the steam turbine 13 is held constant at the output $W_1$ and warming up of the steam turbine 13 is started. After a predetermined time has elapsed, at time t22, when the amount of steam sent from the heat recovery steam generator 12 to the steam turbine 13 increases, the output of the steam turbine 13 increases gradually. At time t23, when the metal temperature of the steam turbine 13 reaches a predetermined temperature and warming up is completed at the output $W_2$ of the steam turbine 13, the control device 50 switches to the second startup mode. Then, the amount of steam sent from the heat recovery steam generator 12 to the steam turbine 13 increases, and the flow rate of the steam sent to the steam turbine 13 by the supplementary firing burner 41 further increases Thus, as the flow rate of the steam supplied increases, the output of the steam turbine 13 increases, and at time t24, the output of the steam turbine 13 increases to an output $W_5$ that is lower than the maximum output $W_m$, so that the combined cycle plant 10 is in partial load operation.

In this case, the output $W_5$ of the steam turbine 13 is the total of the output W/ST-GT by the exhaust gas of the gas turbine 11 and the output W/ST-B by a rise in temperature of the exhaust gas of which the temperature is raised by the supplementary firing burner 41. Accordingly, the output of the steam turbine 13 can be increased to an output $W_4$ using the exhaust heat of the exhaust gas of the gas turbine 11, and can be increased to the output $W_5$ using the exhaust heat resulting from the rise in temperature of the exhaust gas of which the temperature is raised by the supplementary firing burner 41.

In the first operation mode described above, the gas turbine 11 and the supplementary firing burner 41 do not operate at maximum outputs, and the outputs of the gas turbine 11 and the supplementary firing burner 41 can be further increased relative to a required output. In this case, the control device 50 preferentially changes the output of the gas turbine 11 in response to a variation in the target output. In the gas turbine 11, the combustor 22 combusts compressed air and fuel gas and discharges combustion gas (exhaust gas), and the heat recovery steam generator 12 generates steam from this exhaust gas and supplies the steam to the steam turbine 13. Thus, as the amount of fuel gas supplied to the combustor 22 is changed, the output of the gas turbine 11 is changed, and thus the output of the combined cycle plant 10 can be rapidly changed. On the other hand, the supplementary firing burner 41 combusts fuel gas to heat the exhaust gas and thereby increase the flow rate of the steam. Thus, even when the amount of fuel gas supplied to the supplementary firing burner 41 is changed, the output of the gas turbine 11 remains the same, so that a delay occurs in changing the output of the combined cycle plant 10. Therefore, the first operation mode is effective when a fast response to a load change is required while the combined cycle plant 10 is in partial load operation.

As shown in FIG. 1 and FIG. 5, when the control device 50 selects the first startup mode and a small amount of steam is sent from the heat recovery steam generator 12 to the steam turbine 13, the steam turbine 13 starts rotating and the output increases. At time t31, the output of the steam turbine 13 is held constant at the output $W_1$ and warming up of the steam turbine 13 is started. After a predetermined time has elapsed, at time t32, when the amount of steam sent from the heat recovery steam generator 12 to the steam turbine 13 increases, the output of the steam turbine 13 increases gradually. At time t33, when the metal temperature of the steam turbine 13 reaches a predetermined temperature and warming up of the steam turbine 13 is completed at the output $W_2$, the control device 50 switches to the second startup mode. Then, the amount of steam sent from the heat recovery steam generator 12 to the steam turbine 13 increases, and the flow rate of the steam sent by the supplementary firing burner 41 to the steam turbine 13 further increases. Thus, as the amount of steam supplied increases, the output of the steam turbine 13 increases. At time t34, the output of the supplementary firing burner 41 is held constant, and at time t35, the output of the gas turbine 11 increases to the output $W_3$, and the output of the steam turbine 13 increases to the output $W_5$ that is lower than the maximum output $W_m$, so that the combined cycle plant 10 is in partial load operation.

In this case, the output $W_5$ of the steam turbine 13 is the total of the output W/ST-GT by the exhaust gas of the gas turbine 11 and the output W/ST-B by a rise in temperature of the exhaust gas of which the temperature is raised by the supplementary firing burner 41. Accordingly, the output of the steam turbine 13 can be increased to the output $W_3$ using the exhaust heat of the exhaust gas of the gas turbine 11, and can be increased to the output $W_5$ using the exhaust heat resulting from the rise in temperature of the exhaust gas of which the temperature is raised by the supplementary firing burner 41.

In the second operation mode described above, the gas turbine 11 operates at the maximum output, and therefore the output of the gas turbine 11 cannot be further increased relative to the required output, while the supplementary firing burner 41 does not operate at the maximum output, and therefore the output of the supplementary firing burner 41 can be further increased relative to the required output. In this case, the control device 50 holds the output of the gas turbine 11 constant and changes the output of the supplementary firing burner 41 in response to a variation in the target output. When the amount of fuel gas supplied to the combustor 22 is changed, the output of the gas turbine 11 is changed, so that the amount of steam supplied to the steam turbine 13 is changed and the output of the steam turbine is changed. Thus, the plant efficiency of the combined cycle plant 10 is good. By contrast, when the amount of fuel gas supplied to the supplementary firing burner 41 is changed, only the output of the steam turbine 13 is changed, and thus the plant efficiency is poor. Therefore, the second operation mode is effective when there is little variation in the target output while the combined cycle plant 10 is in partial load operation.

As shown in FIG. 1 and FIG. 6, when the control device 50 selects the first startup mode and a small amount of steam is sent from the heat recovery steam generator 12 to the steam turbine 13, the steam turbine 13 starts rotating and the output increases. At time t41, the output of the steam turbine 13 is held constant at the output $W_1$ and warming up of the steam turbine 13 is started. After a predetermined time has elapsed, at time t42, when the amount of steam sent from the heat recovery steam generator 12 to the steam turbine 13 increases, the output of the steam turbine 13 increases gradually. At time t43, when the metal temperature of the steam turbine 13 reaches a predetermined temperature and warming up of the steam turbine 13 is completed at the output $W_2$, the control device 50 switches to a third startup mode (third output change mode). Then, the amount of steam sent from the heat recovery steam generator 12 to the steam turbine 13 increases. As the flow rate of the steam supplied increases, the output of the steam turbine 13 increases, and at time t44, the output of the gas turbine 11 increases to the output $W_3$. At this point, the supplementary firing burner 41 is started up to further increase the flow rate of the steam sent to the steam turbine 13 by the supplementary firing burner 41. Then, at time t45, the output of the steam turbine 13 increases to the output $W_5$ that is lower than the maximum output $W_m$, so that the combined cycle plant 10 is in partial load operation.

In this case, the output $W_5$ of the steam turbine 13 is the total of the output W/ST-GT by the exhaust gas of the gas turbine 11 and the output W/ST-B by a rise in temperature of the exhaust gas of which the temperature is raised by the supplementary firing burner 41. Accordingly, the output of the steam turbine 13 can be increased to the output $W_3$ using the exhaust heat of the exhaust gas of the gas turbine 11, and can be increased to the output $W_5$ using the exhaust heat resulting from the rise in temperature of the exhaust gas of which the temperature is raised by the supplementary firing burner 41.

In the third operation mode described above, as in the second operation mode, the supplementary firing burner 41 does not operate at the maximum output, and therefore the output of the supplementary firing burner 41 can be further increased relative to the required output. In this case, the control device 50 holds the output of the gas turbine 11 constant and changes the output of the supplementary firing burner 41 in response to a variation in the target output. Thus, the plant efficiency of the combined cycle plant 10 is good, and the third operation mode is effective when there is little variation in the target output while the combined cycle plant 10 is in partial load operation.

Figure 7:
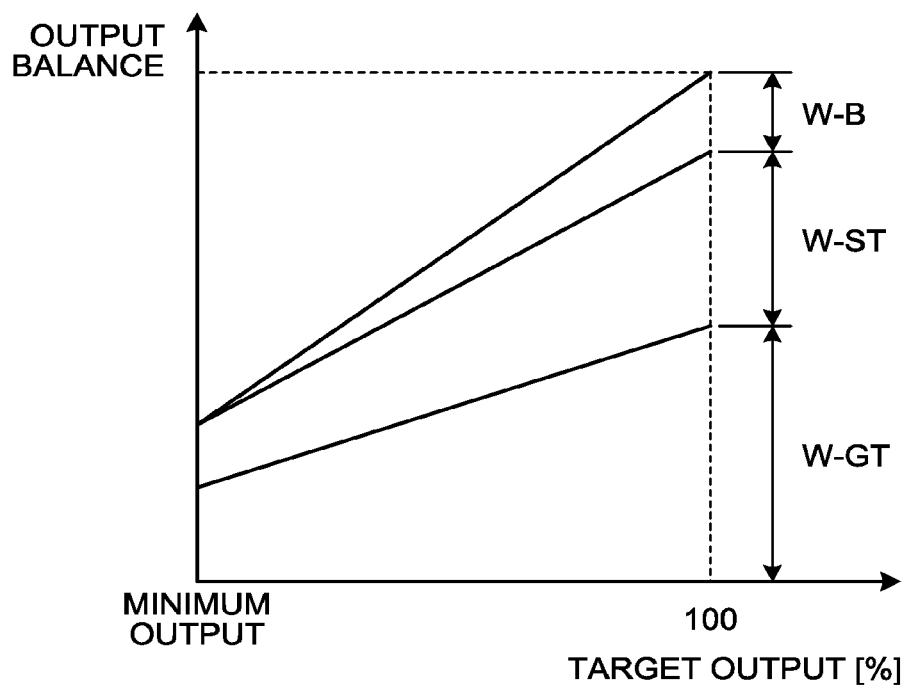
FIG. 7 is a graph showing an output balance of the combined cycle plant during operation with the steam turbine in the first operation mode.
Figure 8:
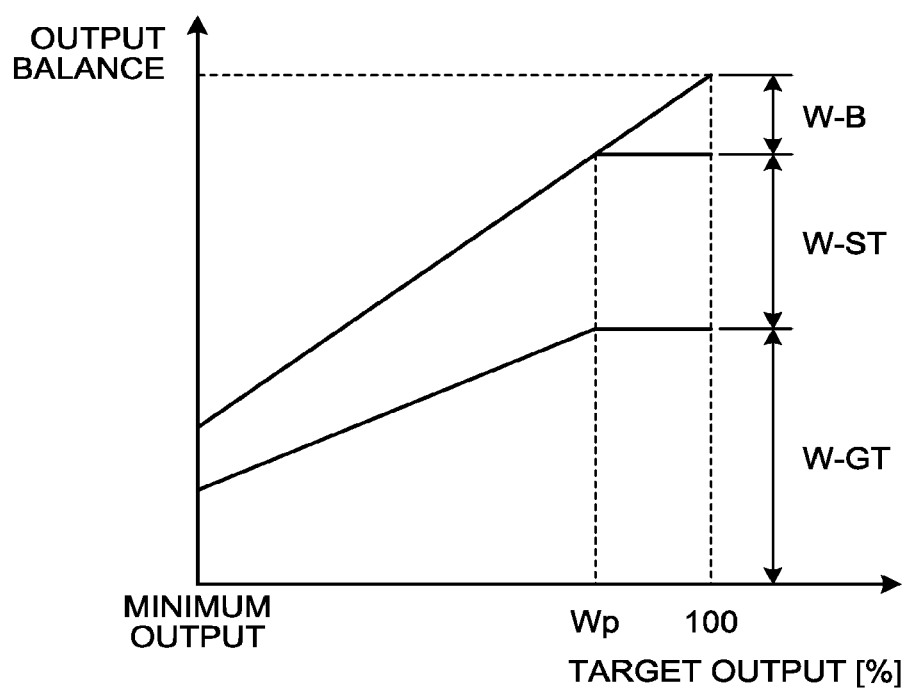
FIG. 8 is a graph showing an output balance of the combined cycle plant during operation with the steam turbine in the second operation mode.

FIG. 7 is a graph showing an output balance of the combined cycle plant during operation with the steam turbine in the first operation mode, and FIG. 8 is a graph showing an output balance of the combined cycle plant during operation with the steam turbine in the second operation mode.

As shown in FIG. 7, in the first operation mode, the output of the gas turbine 11, the output of the steam turbine 13 by only the exhaust gas of the gas turbine 11, and the output of the steam turbine 13 by a rise in temperature of the exhaust gas of which the temperature is raised by the supplementary firing burner 41 are denoted by W-GT, W-ST (W/ST-GT), and W-B (W/ST-B), respectively. In this first operation mode, when the output of the combined cycle plant 10 increases from a minimum output to a maximum output, the gas turbine output W-GT, the steam turbine output W-ST, and the steam turbine output W-B increase proportionally.

By contrast, as shown in FIG. 8, in the second operation mode, when the output of the combined cycle plant 10 increases from the minimum output to the maximum output, the gas turbine output W-GT and the steam turbine output W-ST increase proportionally up to a predetermined output Wp. Then, the gas turbine output W-GT and the steam turbine output W-ST become constant, while the steam turbine output W-B increases. Specifically, as shown in FIG. 6, in the first operation mode, the output of the combined cycle plant 10 is composed of the gas turbine output W-GT, the steam turbine output W-ST, and the steam turbine output W-B throughout the entire range of output, and the gas turbine output W-GT and the steam turbine output W-ST are preferentially adjusted in response to a variation in the required output. By contrast, in the second operation mode, as shown in FIG. 8, the output of the combined cycle plant 10 is composed of the gas turbine output W-GT, the steam turbine output W-ST, and the steam turbine output W-B in the range of output from the predetermined output Wp to the maximum output, and in this range of output, the gas turbine output W-GT and the steam turbine output W-ST are held constant while only the steam turbine output W-B is adjusted in response to a variation in the required output.

In the first and second operation modes, output control of the gas turbine 11 and output control of the supplementary firing burner 41 are not limited to those described above. For example, in the first operation mode (FIG. 4), the control device 50 preferentially changes the output of the gas turbine 11 in response to a variation in the target output, and after the output of the gas turbine 11 reaches the maximum output, the control device 50 changes the output of the supplementary firing burner 41 to respond to a variation in the target output. In the second operation mode (FIG. 5), the control device 50 holds the output of the gas turbine 11 constant at the maximum output and changes the output of the supplementary firing burner 41 in response to a variation in the target output. However, provided that the output of the gas turbine 11 is kept constant relative to a variation in the target output, it is not absolutely necessary to operate the gas turbine 11 at the maximum output. In this case, if it is not possible to respond to a variation in the target output by changing only the output of the supplementary firing burner 41, the output of the gas turbine 11 is changed to respond to the variation in the target output.

As has been described above, the combined cycle plant of this embodiment is provided with: the gas turbine 11 having the compressor 21, the combustor 22, and the turbine 23; the supplementary firing burner 41 that raises the temperature of the exhaust gas of the gas turbine 11; the heat recovery steam generator 12 that generates steam using the exhaust heat of the exhaust gas; the steam turbine 13 that is driven by the steam generated by the heat recovery steam generator 12; and the control device 50 that changes both the output of the combustor 22 and the output of the supplementary firing burner 41 when the output of the combined cycle plant is to be changed.

Accordingly, when the output of the combined cycle plant is to be changed at startup etc., the control device 50 changes the output of the combustor 22 and the output of the supplementary firing burner 41 at the same time. Thus, compared with if these outputs are individually adjusted, the amount of steam supplied from the heat recovery steam generator 12 to the steam turbine 13 can be increased or reduced more quickly, and the output of the combined cycle plant 10 can be increased or reduced more quickly. As a result, it is possible to improve the operability of the combined cycle plant 10 by allowing a quick change of the output.

In the combined cycle plant of this embodiment, the control device 50 has the first startup mode in which the output of the combustor 22 is increased and the supplementary firing burner 41 is not started up at startup of the steam turbine, and the second startup mode in which both the output of the combustor 22 and the output of the supplementary firing burner 41 are increased at startup of the steam turbine, and the control device 50 can selectively switch between the first startup mode and the second startup mode according to a switching signal. Accordingly, it is possible to easily change between startup and shutdown of the supplementary firing burner 41 according to the operation state of the steam turbine 13 by selectively switching between the first startup mode and the second startup mode according to a switching signal.

In the combined cycle plant of this embodiment, the control device 50 selects the first startup mode at startup of the steam turbine 13, and switches to the second startup mode after completion of warming up of the steam turbine 13. Thus, at startup of the steam turbine 13, only the output of the combustor 22 is increased and the steam turbine 13 is warmed up with the steam generated from the exhaust gas of the gas turbine 11, and after completion of warming up of the steam turbine 13, both the outputs of the combustor 22 and the supplementary firing burner 41 are increased to increase the flow rate of the steam supplied to the steam turbine 13 and thereby increase the output of the steam turbine 13. Accordingly, it is possible to reduce the startup time by quickly increasing the output of the steam turbine 13 to a predetermined output after warming up of the steam turbine 13.

In the combined cycle plant of this embodiment, the control device 50 selects the first startup mode at startup of the steam turbine 13, and switches to the second startup mode before the output of the steam turbine 13 reaches the maximum output that is achievable with steam generated using only the exhaust heat of the exhaust gas of the gas turbine 11. Thus, at startup of the steam turbine 13, only the output of the combustor 22 is increased and the steam turbine 13 is warmed up with the steam generated from the exhaust gas of the gas turbine 11, and before the output of the steam turbine 13 reaches the maximum output that is achievable with steam generated using only the exhaust heat of the exhaust gas of the gas turbine 11, i.e., after completion of warming up of the steam turbine 13, both the outputs of the combustor 22 and the supplementary firing burner 41 are increased to increase the flow rate of the steam supplied to the steam turbine 13 and thereby increase the output of the steam turbine 13. Accordingly, it is possible to reduce the startup time by quickly increasing the output of the steam turbine 13 to a predetermined output after warming up of the steam turbine 13.

In the combined cycle plant of this embodiment, the control device 50 has the third startup mode in which the output of the combustor 22 is changed when the output of the combined cycle plant is to be changed, and after a preset predetermined output is reached, the output of the supplementary firing burner 41 is changed, and the control device 50 can selectively switch between the second startup mode and the third startup mode according to a switching signal. Thus, the flexibility can be improved as the control device 50 can select whether to change the outputs of the combustor 22 and the supplementary firing burner 41 at the same time, or to change the output of the combustor 22 and then change the output of the supplementary firing burner 41, when the output of the combined cycle plant is to be changed.

In the combined cycle plant of this embodiment, upon completion of startup of the steam turbine 13, the control device 50 has the first operation mode in which the output of the combustor 22 is preferentially changed in response to a variation in the target output, and the second operation mode in which the output of the combustor 22 is held constant and the output of the supplementary firing burner 41 is changed in response to a variation in the target output. Thus, in the first operation mode, the output of the combustor 22 is preferentially changed in response to a variation in the target output, so that it is possible to rapidly increase and reduce the output of the combined cycle plant by changing the output of the combustor 22, which is highly responsive, according to a variation in the target output. In the second operation mode, the output of the combustor 22 is held constant and the output of the supplementary firing burner 41 is changed in response to a variation in the target output, so that it is possible to improve the plant efficiency by holding the output of the combustor 22 constant relative to the target output and preferentially using this output while keeping down the output of the low-efficiency supplementary firing burner 41.

In the control device of the combined cycle plant of this embodiment, both the output of the combustor 22 and the output of the supplementary firing burner 41 are changed when the output of the combined cycle plant is to be changed. Thus, it is possible to allow a quick change of the output of the combined cycle plant 10.

The steam turbine startup method of this embodiment includes the steps of increasing only the output of the combustor 22 at startup of the steam turbine 13, and increasing both the output of the combustor 22 and the output of the supplementary firing burner 41 after completion of warming up of the steam turbine 13.

Thus, it is possible to reduce the startup time of the combined cycle plant 10 by quickly increasing the output of the steam turbine 13 to a predetermined output after completion of warming up of the steam turbine 13.

In the above embodiment, the startup mode is switched to the second startup mode (second output change mode) upon completion of warming up of the steam turbine 13. Alternatively, the startup mode may be switched before warming up of the steam turbine 13 is completed, or after a predetermined time has elapsed from completion of warming up of the steam turbine 13.

In the above embodiment, the time at which the output W/ST-GT by the exhaust gas of the gas turbine 11 becomes maximum and the time at which the output W/ST-B of the steam turbine 13 by a rise in temperature of the exhaust gas of which the temperature is raised by the supplementary firing burner 41 becomes maximum coincide with each other, but these times may be shifted from each other.

In the above embodiment, operation control during increase in output of the combined cycle plant 10 has been described, but this embodiment is also applicable to operation control during decrease in output.

REFERENCE SIGNS LIST

10 Combined cycle plant
11 Gas turbine
12 Heat recovery steam generator
13 Steam turbine
21 Compressor
22 Combustor
23, 33 Turbine
29, 36, 43 Flow regulating valve
31, 34 Generator
38 Condenser
41 Supplementary firing burner
50 Control device

The invention claimed is:

1. A method of starting up a combined cycle plant, the combined cycle plant comprising:
a gas turbine having a compressor, a combustor, and a turbine;
a supplementary firing burner configured to raise a temperature of an exhaust gas of the gas turbine;
a heat recovery steam generator configured to generate a steam using an exhaust heat of the exhaust gas of the gas turbine; and
a steam turbine configured to be driven by the steam generated by the heat recovery steam generator,
the method comprising:
starting up the gas turbine and the steam turbine;

increasing an output of the combustor while the supplementary firing burner is not started up until after completion of a warming up of the steam turbine;

starting up the supplementary firing burner when the warming up of the steam turbine is completed;

increasing the output of the combustor and an output of the supplementary firing burner after starting up the supplementary firing burner; and after a target output of the combined cycle plant is reached by increasing the output of the combustor and the output of the supplementary firing burner, increasing the output of the combustor upon an increase in the target output of the combined cycle plant and upon the output of the combustor not reaching a maximum;

increasing the output of the supplementary firing burner upon the increase in the target output of the combined cycle plant and upon the output of the combustor reaching the maximum; and making the output of the combustor constant and decreasing the output of the supplementary firing burner upon a decrease in the target output of the combined cycle plant after the target output of the combined cycle plant is reached by increasing the output of the combustor and the output of the supplementary firing burner.

* * * * *